United States Patent [19]

Sato

[11] Patent Number: 4,846,294
[45] Date of Patent: Jul. 11, 1989

[54] CAPACITANCE TYPE WEIGHT SENSOR

[75] Inventor: Hitoshi Sato, Sakado, Japan

[73] Assignee: Tanita Corporation, Tokyo, Japan

[21] Appl. No.: 227,672

[22] Filed: Aug. 3, 1988

[30] Foreign Application Priority Data

Aug. 4, 1987 [JP] Japan ................. 62-118908
Sep. 8, 1987 [JP] Japan ................. 62-136294

[51] Int. Cl.⁴ .......................... G01G 3/14; G01L 1/14
[52] U.S. Cl. ........................... 177/210 C; 73/862.68
[58] Field of Search ................. 177/210 C; 73/862.68

[56] References Cited

U.S. PATENT DOCUMENTS 4,308,929  1/1982  Estavoyer ............. 177/210 C
4,676,328  6/1987  Morino ............... 177/210 C X

FOREIGN PATENT DOCUMENTS 55-147317  11/1980  Japan .
58-176525  10/1983  Japan .

Primary Examiner—George H. Miller, Jr.
Attorney, Agent, or Firm—Fleit, Jacobson, Cohn & Price

[57] ABSTRACT

A capacitance type weight sensor including an upper strictive member integratedly forming the upper half of a stationary strut portion, the upper half of a movable strut potion and an upper beam, and a lower strictive member integratedly forming the lower half of the stationary strut portion, the lower half of the movable strut portion and a lower beam. The upper strictive member and the lower strictive member are coupled and fixed together by a single unit of fixing members, so as to have one end of a stationary electrode sandwiched therebetween, and by a bowl receptacle by a single unit of fixing members, so as to have one end of a movable electrode sandwiched therebetween. The electrodes may be provided with deformable adjusting pieces.

3 Claims, 2 Drawing Sheets

CAPACITANCE TYPE WEIGHT SENSOR

BACKGROUND OF THE INVENTION

1. Field of the invention

This invention relates to a capacitance type weight sensor.

2. Description of the Prior Art

An example of conventional capacitance type weight sensors as used in a weighing instrument such as a capacitance type electronic digital weighing instrument is disclosed in the official gazette of Japanese Patent Application Laid-open No. 55-147317. As schematically shown in FIG. 5 of the accompanying drawings, the conventional capacitance type weight sensor comprises a Roberval mechanism having a stationary strut 1 and a movable strut 2 each formed in the shape of letter U and a pair of beams 3 and 4 of leaf springs connecting the top parts and bottom parts of the stationary and movable struts 1 and 2, a pair of electrodes 7 and 8 fixed to the vertical surfaces of the respective struts 1 and 2 of the Roberval mechanism through insulator members 5 and 6, a base 9 fixedly supporting the vertical surface of the stationary strut 1, and a bowl 10 fixed to the vertical surface of the movable strut 2.

In such a capacitance type weight sensor utilizing a Roberval mechanism, a load applied to the bowl 10 can be detected by conventing the deformation magnitudes of the beams 3 and 4 which flex in proportion to the load into a variation in the capacitance between the electrodes 7 and 8.

However, with the conventional Roberval mechanism mentioned above, the leaf springs functioning as the beams are deformed at the junction points between the two struts 1 and 2 and the two beams 3 and 4 constituting the Roberval mechanism, the deformations of the leaf springs cause the junctions to shift, and the shifts form the factor of weighing errors. Further, since the fixing references of the electrodes and the references of the fixation to the base and the fixation to the bowl receptacle are the vertical surfaces of the strut portions, the deformations of the strut portions form the factor of weighing errors. Another disadvantage is that, since the whole beam undergoes a twist due to a lateral load (a load which deviates from the center line of the beam in the widthwise direction thereof), the inclination of the movable strut ascribable to the lateral load is great, to incline the movable electrode and to break the parallelism of the two electrodes, resulting in the factor of measurement errors. The inclination of the movable strut attributed to the lateral load increases in inverse proportion to the height of the strut portions, and forms an obstacle to the thinning of a product.

Moreover, in such a capacitance type weight sensor, deviations in the parallelism of the electrodes and in the heights of the struts, and the inclinations of the struts form great factors for errors ascribable to biased loads. It exerts a great influence on the cost of fabrication to work the individual constituent components at high precision, and it is not easy to fix the two electrodes to the struts in parallel, so that the errors ascribable to the biased loads deviate greatly. In Japanese Patent Application Laid-open No. 58-176525, therefore, it has been proposed that the parts of the electrodes to be fixed to the struts are improved, and the parallelism between the whole electrode plates is adjusted in an assembling operation, thereby to lessen the biased load errors. However, the deviation of the parallelism of the whole electrode plates is greatly influential on the biased load errors, and the alteration of an angle in the adjustment must be very slight, so that a skill is required for the adjustment. The timing of the locking of a fixation screw (with a locking agent or the like) is also a problem.

Therefore, an object of this invention is to eliminate the disadvantages mentioned above and provide a capacitance type weight sensor which is thin and with a high accuracy.

Another object of this invention is to provide a capacitance type weight sensor wherein fine adjustments for load detecting accuracy can be easily made.

SUMMARY OF THE INVENTION

According to a feature of this invention, there is provided a capacitance type weight sensor comprising a base, a stationary strut portion fixed to the base, a bowl receptacle to which a load is to be applied, a movable strut portion supporting said bowl receptacle, an upper beam connecting the upper parts of the stationary and movable strut portion to perform strictive action balancing with the load, a lower beam connecting the lower parts of the stationary and movable strut portion to perform strictive action balancing with the load, a stationary electrode fixed to the stationary strut portion, and a movable electrode fixed to said movable strut portion, thereby providing an electrostatic capacitance between the stationary electrode and the movable electrode, characterized in that an upper strictive member integrally forms the upper half of said stationary strut portion, the upper half of the movable strut portion and the upper beam, a lower strictive member integrally forms the lower half of said stationary strut portion, the lower half of said movable strut portion and the lower beam, the upper strictive member has a thick-walled portion forming the upper half of the stationary strut portion and one end portion of the upper beam at one end thereof, a thick-walled portion forming the upper half of the movable strut portion and the other end portion of the upper beam at the other end thereof and an intermediate portion connecting the thick-walled portions at the one end and the other end thereof through a thin-walled striction portion engraved in a circular-arc groove shape and forming the intermediate portion of the upper beam, the lower strictive member has a thick-walled portion forming the lower half of the stationary strut portion and one end portion of the lower beam at one end thereof, a thick-walled portion forming the lower half of the movable strut portion and the other end portion of the lower beam at the other end thereof and an intermediate portion connecting the thick-walled portions at the one end and the other end thereof through a thin-walled striction portion engraved in a circular-arc groove shape and forming the intermediate portion of the lower beam, the one end thick-walled portion of said upper strictive member and the one end thick-walled portion of the lower strictive member are coupled and fixed together with the base by means of a single unit of fixing members, so as to have one end of the stationary electrode sandwiched therebetween, and the other end thick-walled portion of the upper strictive member and the other end thick-walled portion of the lower strictive member are coupled and fixed together with the bowl receptacle by means of a single unit of fixing members, so as to have one end of the movable electrode sandwiched therebetween.

According to another feature of this invention, there is porvided a capacitance type weight sensor as defined above wherein a peripheral edge portion of at least one of the stationary and movable electrodes is proviede with a plurality of notches to form one or more adjusting pieces which are deformable at any desired angle to make it possible to effect fine adjustment of detecting accuracy.

This invention will now be described in further detail with regard to preferred embodiments as illustrated in the accompanying drawings.

DESCRIPTION OF THE PREFERRED EMBODIMENTS

Figure 1:
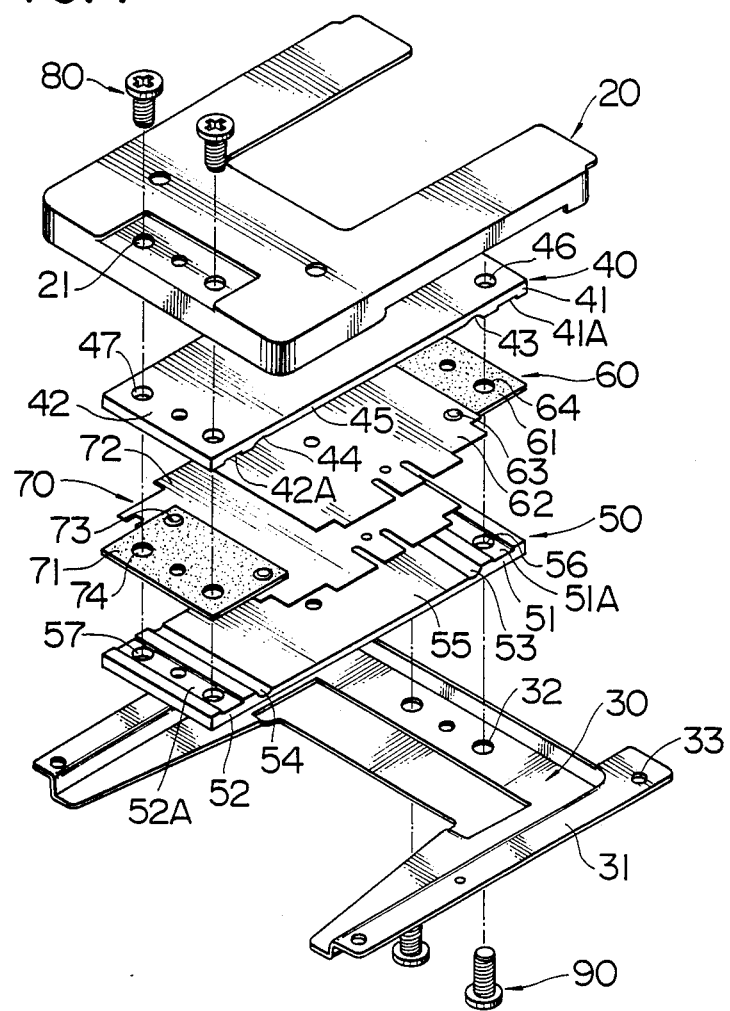
FIG. 1 is an exploded perspective view showing an embodiment of a capacitance type weight sensor according to this invention.

Referring to FIG. 1, there is shown an embodiment of a capacitance type weight sensor according to this invention. The weight sensor comprises a bowl receptacle to which a load is to be applied, a base 30, an upper strictive member 40, a lower strictive member 50, a stationary electrode 60, a movable electrode 70, and fixing screws 80 and 90.

As shown in FIG. 1, the side surfaces of the bowl receptacle 20 are stamped to provide rise portions, thereby to increase the strength of the bowl receptacle and to form junctions with a bowl (not shown) and stoppers for limiting the movement distance of a movable strut against an excess load in cooperation with the base 30. The junction of the bowl receptacle 20 with the upper strictive member 40, is subjected to joggling for both an indent for screw heads and a rest for providing a clearance between the bowl receptacle 20 and the upper strictive member 40. Also the junction is provided with holes 21 to be engaged by the screws 80.

As shown in FIG. 1, the side surfaces of the base 30 are worked in the shape of cranks, to raise the strength thereof, and the flat part 31 of each crank is provided with holes 33 for fixation with a cover case (not shown). The junction of the base 30 with the lower strictive member 50 is subjected to joggling for both an indent for screw heads and a rest for providing a clearance between the base 30 and the lower strictive member 50. Also, the junction is provided with holes 32 to be engaged by the screws 90.

The upper strictive member 40 is integratedly formed to have three different thicknesses. Namely, the upper strictive member 40 has a thick-walled portion 41 forming the upper half of the stationary strut portion and one end portion of the upper beam at one end thereof, a thick-walled portion 42 forming the upper half of the movable strut portion and the other end portion of the upper beam at the other end thereof and an intermediate portion 45 connecting the thick-walled portions 41 and 42 at the one end and the other end thereof through a thin-walled striction portion 43, 44 engraved in a circular-arc groove shape and forming the intermediate portion of the upper beam. The thickness of the intermediate portion 45 is made smaller than those of the thick-walled portions 41 and 42, but larger than those of the striction portions 43 and 44. The inner ends of the thick-walled portions 41 and 42 are provided at the center thereof with recesses 41A and 42A respectively, for fixing one ends of the stationary and movable electrodes 60 and 70 securely and horizontally. The thick-walled portion 41 is provided in the recess 41A with screw holes 46 which are to be engaged by the screws 90, and the thick-walled portion 42 is provided in the recess 42A with holes 47 which are to pass the screws 80.

The lower strictive member 50 may be have the same shape as the upper strictive member 40, and is integratedly formed to have three different thickness, similarly with the upper strictive member 40. Namely, the lower strictive member 50 has a thick-walled portion 51 forming the lower half of the stationary strut portion and one end portion of the lower beam at one end thereof, a thick-walled portion 52 forming the lower half of the movable strut portion and the other end portion of the lower beam at the other end thereof and an intermediate portion 55 connecting the thick-walled portions 41 and 42 at the one end and the other end thereof through a thin-walled striction portion 53, 54 engraved in a circular-arc groove shape and forming the intermediate portion of the lower beam. The thickness of the intermediate portion 55 is made smaller than those of the thick-walled portions 51 and 52, but larger than those of the striction portions 53 and 54. The inner ends of the thick-walled portions 51 and 52 are provided at the center thereof with recesses 51A and 52A respectively, for fixing one ends of the stationary and movable electrodes 60 and 70 securely and horizontally. The thick-walled portion 51 is provided in the recess 51A with holes 56 which are to pass the screws 90, and the thick-walled portion 52 is provided in the recess 52A with screw holes 57 which are to be engaged by the screw 80.

In the upper and lower strictive members 40 and 50, the ratios of the thicknesses of the striction portions 43, 44 and 53,54, the intermediate portions 45 and 55 and the thickwalled portions 41, 42 and 51, 52 may be suitably selected, depending on the magnitude of a load to be detected, but preferably about 1:3:5 to 1.5:3:5.

The stationary electrode 60 comprises an insulator plate 61 and an electrically conductive thin plate 62 fixed to the insulator plate 61 by rivets 63. The insulator plate 61 is made of a material which has a good electrically insulating property, exhibits a high flatness, endures a clamping force and does not undergo buckling, for example glass fiber-reinforced epoxy resin. As described below, the insulator plate 61 is fixed in a manner to be held between the upper and lower strictive members 40 and 50 and forms a part of the stationary strut portion. The insulator plate 61 is provided with holes 64 for passing the screws 90.

The movable electrode 70 may have the same shape as the stationary electrode 60 and comprises an insulator plate 71 and an electrically conductive thin plate 72 fixed to the insulator plate 71 by rivets 73. The insulator plate 71 is also made of a material which has a good electrically insulating property, exhibits a high flatness, endures a clamping force and does not undergo buckling, for example glass fiber-reinforced epoxy resin. As described below, the insulator plate 71 is fixed in a manner to be held between the upper and lower strictive members 40 and 50 and forms a part of the movable strut portion. The insulator plate 71 is provided with holes 74 for passing the screws 80.

How to assemble the capacitance type weight sensor will be described in connection with FIG. 2 which is a schematically sectional view showing the capacitance type weight sensor of FIG. 1 in an assembled condition. Assembling the capacitance type weight sensor of FIG. 1, as shown in FIG. 2, the one end thick-walled portion 41 of the upper strictive member 40 and the one end thick-walled portion 51 of the lower strictive member 50 are coupled and fixed together with the base 30 by engaging the screws 90 with the holes 32, holes 56 and 64 nd screw holes 46, so as to have the insulator plate 61 of the stationary electrode 60 sandwiched therebetween, while the other end thick-walled portion 42 of the upper strictive member 40 and the other end thick-walled portion 52 of the lower strictive member 50 are coupled and fixed together with the bowl receptacle 20 by engaging the screws 80 with the holes 21, holes 47 and 74 and screw holes 57, so as to have the insulator plate 71 of the movable electrode 70 sandwiched therebetween.

Figure 3:
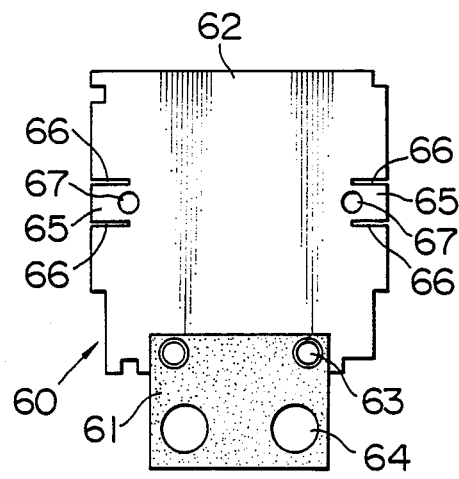
FIG. 3 is a schematic plan view showing in detail an electrode as used in the capacitance type weight sensor of FIG. 1.

In this embodiment, the stationary and movable electrodes 60 and 70 are provided with adjusting pieces for facilitating fine adjustment of the electrostatic capacitance formed between the stationary and movable electrodes 60 and 70. The structure of the adjusting piece will be described in connection with FIG. 3 which is a schematic plan view showing the stationary electrode 60. As shown in FIG. 3, two notches 66 the interval and lenght of which are respectively equal to about one tenth of the length of the ride of the electrically conductive thin plate 62 are provided in the central part of each of the opposing side edges of the electrically conductive thin plate 62 and a hole 67 is provided near the root parts of the notches 66, thereby forming an adjusting piece 65. The movable electrode 70 is provided with adjusting pieces, similarly with the stationaly electrode 60.

Figure 4:
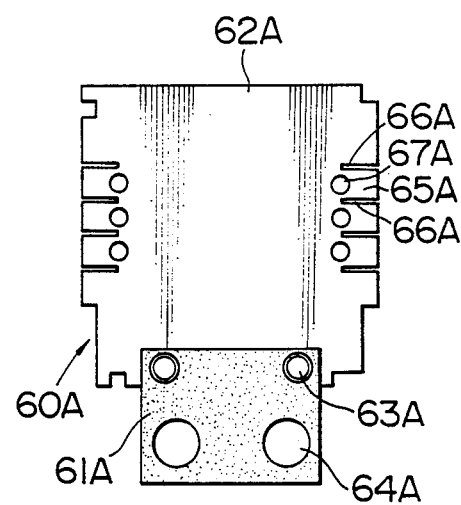
FIG. 4 is a schematic plan view showing another embodiment of an electrode as used in the capacitance type weight sensor of FIG. 1.
Figure 5:
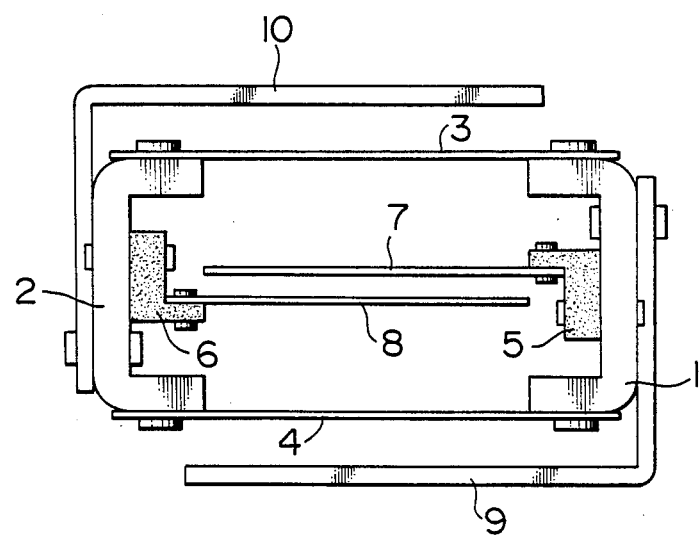
FIG. 5 is a schematically sectional view showing an example of conventional capacitance type weight sensor.

FIG. 4 shows another embodiment of the stationary electrode, similarly with FIG. 3. As shown in FIG. 3, a stationary electrode 60A comprises an insulator plate 61A having holes 64A and an electrically conductive thin plate 62A fixed to the insulator plate 61A by rivets 63A. The electrically conductive thin plate 62A is provided at each of the opposing side edges with three adjusting pieces 65A by forming four notches 66A and three holes 67A.

Figure 2:
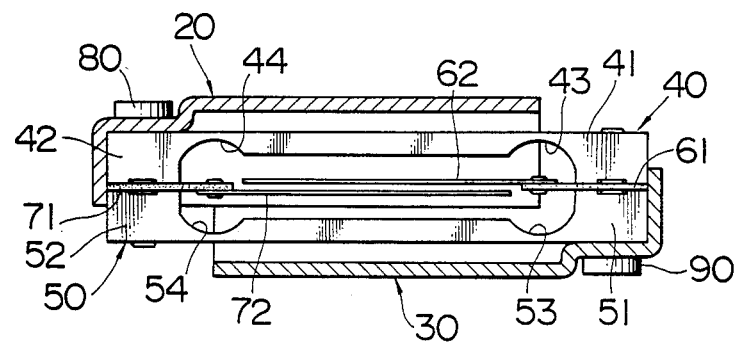
FIG. 2 is a schematically sectional view showing the capacitance type weight sensor of FIG. 1 in an assembled condition.

In this embodiment, since the adjusting pieces are provided at the side edges of the electrodes, after the capacitance type weight sensor is assembled as shown in FIG. 2, the adjusting piece to be bent is selected in conformity with the tendency and magnitudes of biased load errors in a preliminary measurement, and it is bent to an angle suited to the magnitudes of the biased load errors, thereby easily effecting fine adjustment of detecting accuracy. Namely, since the adjusting piece can be bent so that the partial area of the whole area of the electrode, for example, approximately one hundredth of the area of the electrode plate may be inclined, a fine adjustment can be readily performed.

The striction of a leaf spring subjected to a load is in inverse proportion to the cube of the thickness of the material of the spring. Owing to the construction of the present device, the thickness of a junction becomes several times that of the thin-walled portion proviede as the striction portion, and the deformation of the material at the junction is very small, so that influence by the deformation is negligible. Besides, the thickness of the material of the beam portion is set at about 2–3 times the thickness of the striction portion, and the striction portion is formed by the circular-arc groove, whereby the part of the striction portion to undergo a twist shortens to a negligible degree, and the twist of the beam nearly equalizes to that of the beam. Thus, the magnitude of the inclination of the movable strut becomes several hundredths—several tenths of the inclination developing in the prior-art method, and the inclination of the electrode is slight, so that the error attributed to the lateral load becomes smaller by one order (becomes less than one tenth).

The upper and lower strictive members are thinned to the utmost, and the insulation portions of the electrodes are used as parts of the struts by holding the electrodes between the middle parts of the strut portions. Therefore, the motion of the electrode follows up that of the strut precisely. Regarding the difference of the movement magnitudes of the movable strut attributed to the discrepancy of turning moments attendant upon the positional discrepancy of the load points of the beam in the lengthwise direction thereof, the difference of the inclinations of the movable strut caused by the turning moments appears as the difference of the inclinations of the electrode, and the movement distance of the electrode is limited. Thus, a weighing error becomes very small owing to the corrections of both the aspects, and a capacitance type weight sensor which is very thin and is highly precise is obtained.

As described above, the capacitance type weight sensor of this invention can provied the following functional advantages:

(1) The junctions do not include any part where a material is deformed by a load, so that an accurate weighing proportional to the load is always possible;

(2) since the striction portion is in the circular-arc groove shape, the span of a twisted part ascribable to a lateral load is short, the inclination of the movable strut is small, and the parallelism of the electrodes is little disturbed, so that a laterally-biased load error is slight;

(3) owing to the thinnest possible setup, the difference of the movement distances of the movable strut attendant upon the difference of the magnitudes of turning moments attributed to vertically-biased loads appears as the difference of the magnitudes of the inclinations of the movable strut affecting the movement distances of the electrode attendant upon the difference of the magnitudes of the turning moments, and mutual corrections act, so that a vertically-biased load error is very small; and (4) the rise parts of the bowl receptacle, the rise parts of the base, and the upper and lower beams shield the electrode from disturbances, so that stable measurement values are always obtained;

(5) Further, it results in decrease in the number of components and curtailment in the number of assembly stages that the assembly of the Roberval mechanism, the mounting of the electrodes, and the fixation of the bowl receptacle to the base are each performed with one set of screws at one time, whereby the cost of the product can be reduced; ad (6) One or more adjusting pieces on the side on which larger values were indicated in a preliminary measurement, is/are bent in the direction of spreading the spacing of the electrode plates, in the number of the adjusting pieces and at the bent angles thereof adapted to the values of the preliminary measurement, whereby biased load errors can be adjusted very simply and precisely.

What is claimed is:

1. A capacitance type weight sensor comprising a base, a stationary strut portion fixed to said base, a bowl receptacle to which a load is to be applied, a movable strut portion supporting said bowl receptacle, an upper beam connecting the upper parts of said stationary and movable strut portion to perform strictive action balancing with the load, a lower beam connecting the lower parts of said stationary and movable strut portion to perform strictive action balancing with the load, a stationary electrode fixed to said stationary strut portion, and a movable electrode fixed to said movable strut portion, thereby providing an electrostatic capacitance between said stationary electrode and said movable electrode, characterized in that an upper strictive member integrally forms the upper half of said stationary strut portion, the upper half of said movable strut portion and said upper beam, a lower strictive member integrally forms the lower half of said stationary strut portion, the lower half of said movable strut portion and said lower beam, said upper strictive member has a thick-wllled portion forming the upper half of said stationary strut portion and one end portion of said upper beam at one end thereof, a thick-walled portion forming the upper half of said movable strut portion and the other end portion of said upper beam at the other end thereof and an intermediate portion connecting said thick-walled portions at the one end and the other end thereof through a thin-walled striction portion engraved in a circular-arc groove shape and forming the intermediate portion of said upper beam, said lower strictive member has a thick-walled portion forming the lower half of said stationary strut portion and one end portion of said lower beam at one end thereof, a thick-walled portion forming the lower half of said movable strut portion and the other end portion of said lower beam at the other end thereof and an intermediate portion connecting said thick-walled portions at the one end and the other end thereof through a thin-walled striction portion engraved in a circular-arc groove shape and forming the intermediate portion of sid lower beam, said one end thick-walled portion of said upper strictive member and said one end thick-walled portion of said lower strictive member are coupled and fixed together with said base by means of a single unit of fixing members, so as to have one end of said stationary electrode sandwiched therebetween, and said other end thick-walled portion of said upper strictive member and said other end thick-walled portion of said lower strictive member are coupled and fixed together with said bowl receptacle by means of a single unit of fixing members, so as to have one end of said movable electrode sandwiched therebetween.

2. A capacitance type weight sensor as claimed in claim 1 wherein an insulator plate is provided at said one end of said stationary electrode and movable electrode, and the spacing between said electrodes is made equal to the thickness of the insulator plate of said electrodes under no load.

3. A capacitance type weight sensor as claimed in claim 1 wherein a peripheral edge portion of at least one of said stationary and movable electrodes is provided with a plurality of notches to form one or more adjusting pieces which are deformable at any desired angle to make it possible to effect fine adjustment of detecting accuracy.

* * * * *